United States Patent Office 3,449,438
Patented June 10, 1969

3,449,438
PROCESS FOR THE PRODUCTION OF YLENALS
Herwig Freyschlag, Werner Reif, Axel Nuerrenbach, and Wilhelm Sarnecki, Ludwigshafen (Rhine), Germany, assignors to Badische Anilin- & Soda Fabrik Aktiengesellschaft, Ludwigshafen (Rhine), Germany
No Drawing. Filed Nov. 19, 1964, Ser. No. 412,326
Claims priority, application Germany, Nov. 30, 1963, B 74,473
Int. Cl. C07f 9/28
U.S. Cl. 260—599          4 Claims

ABSTRACT OF THE DISCLOSURE

Production of a ylenal such as triphenylphosphine-2-formylpropen-(1)-yl-1-methylene by reacting the corresponding quaternary phosphonium salt with a proton acceptor in liquid phase. The new compound is useful in producing a carotenoid having known application as a food coloring agent.

This invention relates to ylenals as new compounds. It also relates to the manufacture of such compounds.

The term "ylenals" is intended to designate compounds which in the same molecule contain a phosphorylene grouping and an aldehyde group in conjugated relationship and may, for example, have the formula

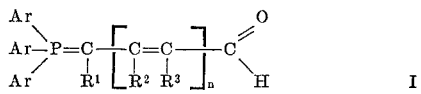

where Ar is an aryl radical that may be substituted by alkyl or alkoxy groups, $R^1$, $R^2$ and $R^3$ are hydrogen or alkyl groups and $n$ is 1 or an integer greater than 1.

It is an object of the present invention to provide new compounds. Another object of the invention is new compounds that are suitable as starting materials for the Wittig synthesis. A further object of the invention is to manufacture the new comopunds.

We have found that ylenals of the Formula I where Ar, $R^1$, $R^2$ and $R^3$ have the meanings given above and $n$ is an integer from 1 to 12, preferably from 1 to 6, are obtained by allowing a proton acceptor to act on a phosphonium salt of the formula

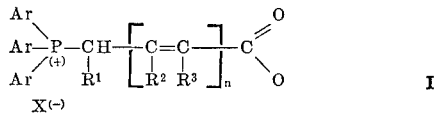

where Ar, $R^1$, $R^2$, $R^3$ and $n$ have the meanings given above and $X^{(-)}$ denotes a univalent anion. The process according to this invention may be carried out in an anhydrous medium using organic solvents, mixtures of water and organic solvents, or water without organic solvents.

The course and result of this reaction are extremely surprising since it was not to be expected that the products of the process would be sufficiently stable both during their formation and in the finished state. It was rather to be expected that they would show a pronuonnced tendency to undergo side reaction, such as polymerization, or would be readily accessible to other detrimental changes, for example under the influence of atmospheric oxygen. It is known from other conjugated systems that they are unstable, especially when several double bonds are present. Therefore it is particularly surprising that it should be possible to produce even the higher members of the ylenals obtainable according to the invention in aqueous or alcoholic solutions and that they should not be hydrolyzed unless boiled. Unlike other ylenes even the higher ylenals are little sensitive to air and under normal conditions do not tend to polymerize or undergo spontaneous condensation.

The phosphonium salts (II) used as starting materials for the process according to this invention may be obtained by methods known per se, e.g., by reacting a suitable halogen compound with a triarylphosphine in an organic solvent. The phosphonium salts are obtained either in solid form so that they can be readily isolated, or they may be obtained by evaporation of the solvent. In some cases they may be recovered from their solutions by shaking with water. The process according to this invention may also be carried out using directly solutions of phosphonium salts (II) as present in the manufacture in water and/or organic solvents. The aromatic radical Ar in Formulas I and II is preferably phenyl which may be substituted by methyl or methoxy such as toluyl or methoxyphenyl. The alkyl radicals R are preferably methyl and/or ethyl.

The proton acceptors may be either organic or inorganic compounds. Suitable compounds are basic substances having a pk-value of approximately less than 9, such as alcoholates, for example the alkali metal alcoholates, sodium methylate and sodium ethylate, ammonia, amines such as the alkylamines, trimethylamine, triethylamine or diethylamine, or the heterocyclic amine piperidine, but especially aqueous alkali solutions, such as caustic soda or caustic potash solution. It is expedient to use an equivalent amount of proton acceptor, based on the phosphonium salt. Excess amounts of proton acceptor are not detrimental. The alcoholates are used as proton acceptors preferably in anhydrous methyl alcohol or ethyl alcohol. The amines may also with advantage be used in alcohols.

Examples of suitable solvents are, besides water, for example dimethylformamide, dimethyl sulfoxide, acetonitrile, alcohol, hydrocarbons, halogenated hydrocarbons such as chloroform or ethers. As this list shows, the solvents may be either organic liquids which are miscible with water, or organic liquids which are immiscible with water. Mixtures of two or more organic solvents or of organic solvents with water may also be used. Those skilled in the art will have no difficulty in selecting a solvent which is suitable in organic synthesis and which may be used in the process according to this invention.

When the process according to this invention is carried out in aqueous solution, the ylenals are in general obtained immediately in solid form and may be isolated or, if desired, further reacted either in this form or after recrystallization from organic solvents. If the process is carried out in organic solvents, the products of the process may be recovered by pecipitation with water or evaporation of the solvent. It is recommendable to remove beforehand any excess of proton acceptor and the salts formed from the H-X split off, for example halides, sulfates and sulfonates. It is also possible to use the solutions of the ylenals obtained by the process according to this invention for further reactions without isolation. The monovalent anion $X^{(-)}$ may be free from further negative charges, as for example the chlorine and bromine ions. The monovalent anion $X^{(-)}$ may also have an additional negative charge, as for example the sulfate ion. Ions of strong or fairly strong acids are preferred, for example of hydrochloric acid, sulfuric acid or organic sulfonic acids.

The process according to this invention is preferably carried out at the ambient temperature or with cooling. It is also possible however to use higher temperatures, for example temperatures up to +100° C.

Compounds of the general Formula I where however $n$ is 0, Ar is phenyl and $R^1$ is H or methyl are described in J. Chem. Soc., 1266 (1961). They are stable crystalline substances which enter into the usual condensation reaction with aldehydes only at elevated temperatures. The compounds are presumably prevented from undergoing spontaneous condensation by mesomerism between any ylenal structure (IIIa) and a betaine structure (IIIb):

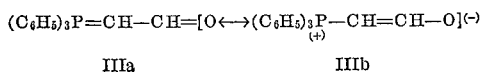

IIIa  IIIb

It was to be expected that in the case of the higher members of this series in which the ylene and aldehyde groups are more distant from each other the betaine structure would be less pronounced so that the stability of the ylenals would be less, resulting in spontaneous condensation, polymerization or resinification. The process according to this invention and the stable properties of the products are therefore particularly remarkable.

Ylenals obtainable according to this invention include:

triphenylphosphine-2-formylpropen-(1)-yl-1-methylene,
triphenylphosphine-3-formylpropen-(2)-yl-2-methylene,
triphenylphosphine-2-methyl-4-formylbutadien-(1,3)-yl-1-methylene,
triphenylphosphine-1-methyl-4-formylbutadien-(1,3)-yl-1-methylene and
triphenylphosphine-2,6-dimethyl-6-formylhexatrien-(1,3,5)-yl-1-methylene.

The ylenals obtainable according to the invention are new. They are valuable intermediates for the synthesis of dyes, pharmaceuticals, plant protection agents, food dyes and carotenoids. Moreover, they are themselves plant protection agents and agents for initiating polymerizations.

The parts specified in the examples are parts by weight. They bear the same relation to parts by volume as the gram to the cubic centimeter.

EXAMPLE 1

30 parts of triphenyl-3-formylbuten-2-yl-1-phosphonium chloride is dissolved in 2000 parts of water and then aqueous caustic soda solution is added until the solution is clearly alkaline. The precipitate is filtered off and dried. 25 parts of triphenylphosphine-2-formylpropen-1 - yl - 1-methylene is obtained which may be purified by recrystallization from acetonitrile or acetic ester. Melting point 203 to 205° C.; yellow prisms. $C_{23}H_{21}OP$. Calculated: C, 80.21%; H, 6.15%; P, 8.99%. Found: C, 80.3%; H, 6.2%; P, 9.3%. Ultraviolet maxima (in ethanol) at 225 and 350 m$\mu$.

$$(E_{1cm}^{1\%}=807 \text{ and } 896)$$

In the ultrared spectrum the ylenal shows a strong band at 6.5$\mu$ which is to be attributed to the strongly polarized aldehyde groups. The produced compound has the formula

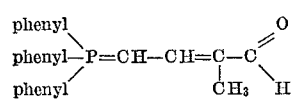

EXAMPLE 2

118.5 parts of 3-formyl-1-chlorobutene-2 is dripped while stirring into a solution of 262 parts of triphenylphosphine in 500 parts by volume of toluene. The mixture is heated for 2 hours at the boil and allowed to cool. By filtration there is obtained 305 parts of triphenyl-3-formylbuten-2-yl-1-phosphonium chloride which can be reacted without further purification. Melting point (from acetonitrile) is 249° C.

100 parts of the crude salt is dissolved in 200 parts by volume of ethanol, 40 parts by volume of triethylamine is added and the whole is diluted with 4000 parts of water while stirring. The precipitate is filtered off by suction and 83 parts of triphenylphosphine-2-formylpropen-1-yl-1-methylene is obtained which can be used for further reactions without purification.

We claim:

1. A process for the production of ylenals of the formula

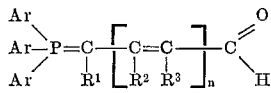

where Ar is a member selected from the group consisting of phenyl, toluyl and methoxyphenyl, $R^1$, $R^2$ and $R^3$ are independently selected from the group consisting of hydrogen and alkyl, and $n$ is an integer from 1 to 3, which comprises reacting a proton acceptor in liquid phase with a quaternary phosphonium salt of the formula

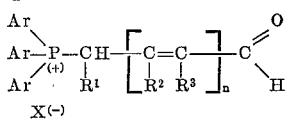

where Ar, $R^1$, $R^2$, $R^3$ and $n$ have the meanings given above and $X^{(-)}$ is a monovalent anion.

2. A process as claimed in claim 1 wherein ammonia is used as the proton acceptor.

3. A process as claimed in claim 1 wherein an amine is used as the proton acceptor.

4. A process as claimed in claim 1 wherein the proton acceptor used is an aqueous solution of an alkali selected from the group consisting of sodium and potassium.

References Cited

UNITED STATES PATENTS 2,983,739  5/1961  Pommer et al. __ 260—598 XR
3,000,982  9/1961  Surmatis _____ 260—598 XR

OTHER REFERENCES

Wittig et al., Chemical Abstracts, vol. 48 (1954), pp. 7566-7567.

BERNARD HELFIN, *Primary Examiner.*

U.S. Cl. X.R.

260—600, 598